United States Patent
Gopalan et al.

(10) Patent No.: US 12,537,440 B2
(45) Date of Patent: Jan. 27, 2026

(54) SWITCH CONTROL METHOD TO SUPPRESS THE EFFECT OF EVEN ORDER HARMONICS IN SUPPLY VOLTAGE ON ASD

(71) Applicants: Indian Institute of Technology, Madras (IIT Madras), Chennai (IN); Danfoss Power Electronics A/S, Gråsten (DK)

(72) Inventors: Seshadri Gopalan, Chennai (IN); Dinesh Kumar, Nordborg (DK); Krishna Vasudevan, Chennai (IN)

(73) Assignees: DANFOSS POWER ELECTRONICS A/S, Gråsten (DK); INDIAN INSTITUTE OF TECHNOLOGY, MADRAS, Chennai (IN)

( * ) Notice: Subject to any disclaimer, the term of this patent is extended or adjusted under 35 U.S.C. 154(b) by 193 days.

(21) Appl. No.: 17/958,771

(22) Filed: Oct. 3, 2022

(65) Prior Publication Data

US 2023/0108457 A1 Apr. 6, 2023

(30) Foreign Application Priority Data

Oct. 4, 2021 (IN) .............................. 202141044858

(51) Int. Cl.
| | | |
|---|---|---|
| *H02M 1/12* | (2006.01) | |
| *H02M 1/08* | (2006.01) | |
| *H02M 7/162* | (2006.01) | |

(52) U.S. Cl.
CPC ............. *H02M 1/12* (2013.01); *H02M 1/083* (2013.01); *H02M 7/1626* (2013.01)

(58) Field of Classification Search
CPC ........... H02M 1/32; H02M 1/325; H02M 1/12
See application file for complete search history.

(56) References Cited

U.S. PATENT DOCUMENTS 7,148,661 B2    12/2006   Trainer et al.
7,495,938 B2    2/2009    Wu et al.
(Continued)

FOREIGN PATENT DOCUMENTS

EP      2 312 739 B1    4/2011
JP      4673174 B2      4/2011

OTHER PUBLICATIONS

E. Ngandui, G. Olivier, G. .-E. April and C. Guimaraes, "DC harmonic distortion minimization of thyristor converters under unbalanced voltage supply using asymmetrical firing angle," in IEEE Transactions on Power Electronics, vol. 12, No. 2, pp. 332-342, Mar. 1997 (Year: 1997).*

(Continued)

*Primary Examiner* — Peter M Novak
(74) *Attorney, Agent, or Firm* — McCormick, Paulding & Huber PLLC

(57) ABSTRACT

The invention discloses systems (100) and methods (200, 300) for reducing the effect of even-order harmonics in supply voltage on the DC side components in AC-DC converters having any kind of controlled power electronic switches or their combinations. The method involves modifying the time of firing the various switches (112, 114) through a control logic arrives at through either measuring or estimating the DC bus voltage or the input AC voltage. The proposed control methods are useful in ASDs where full bridge configuration is used for AC to DC conversion. The proposed control may also be used in ASDs where a half bridge rectifier system is used. The proposed method reduces the stress on the DC bus capacitor and increases the lifetime of the capacitor. It further reduces the peak current through the device, which reduces stress on the rectifier components. It also reduces the Total Harmonic Distortion ($THD_i$) of the line current.

20 Claims, 12 Drawing Sheets

(56) References Cited

U.S. PATENT DOCUMENTS

| | | | | |
|---|---|---|---|---|
| 2010/0254169 | A1* | 10/2010 | Yamaji | H02M 1/12 |
| | | | | 363/40 |
| 2013/0033907 | A1* | 2/2013 | Zhou | H02J 3/01 |
| | | | | 363/37 |
| 2019/0363533 | A1* | 11/2019 | Schierling | G01R 31/52 |

OTHER PUBLICATIONS

Y. Liu & G. T. Heydt (2005) Power System Even Harmonics and Power Quality Indices, Electric Power Components and Systems, 33:8, 833-844, DOI: 10.1080/15325000590909778 (Year: 2007).*
S. Gopalan, K. Vasudevan, D. Kumar and p. Shanmugam, "Impact of Supply Voltage Harmonics on dc bus Capacitor and Inductor of Adjustable Speed Drives," 2019 IEEE 13th International Conference on Compatibility, Power Electronics and Power Engineering (CPE-PowerEng), Sonderborg, Denmark, 2019, pp. 1-7, (Year: 2019).*

* cited by examiner

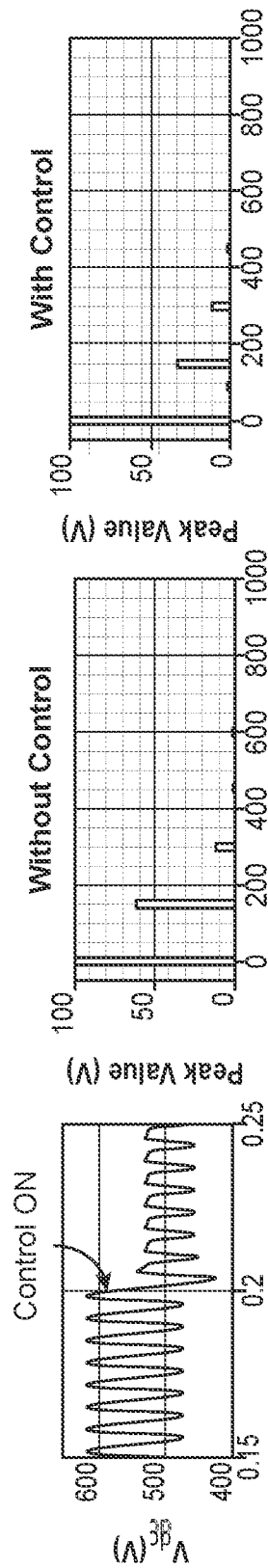
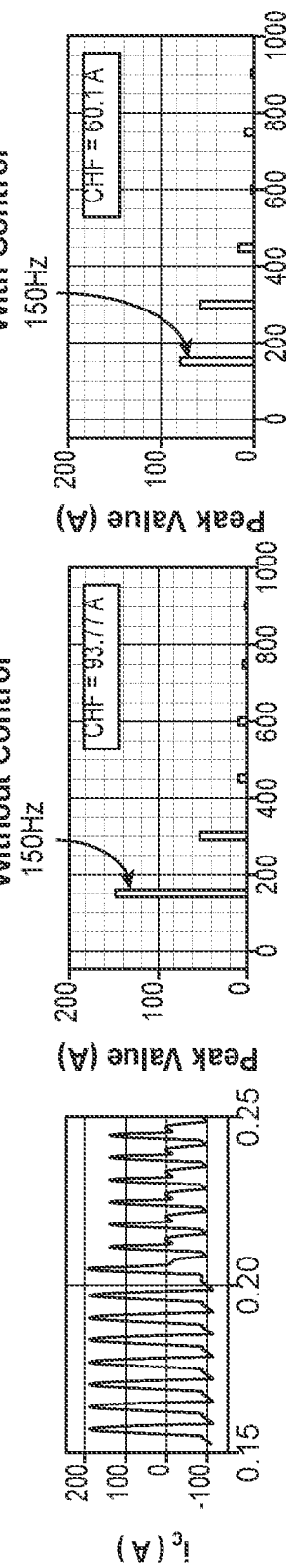
FIG. 8A  FIG. 8B  FIG. 8C
FIG. 8D  FIG. 8E  FIG. 8F

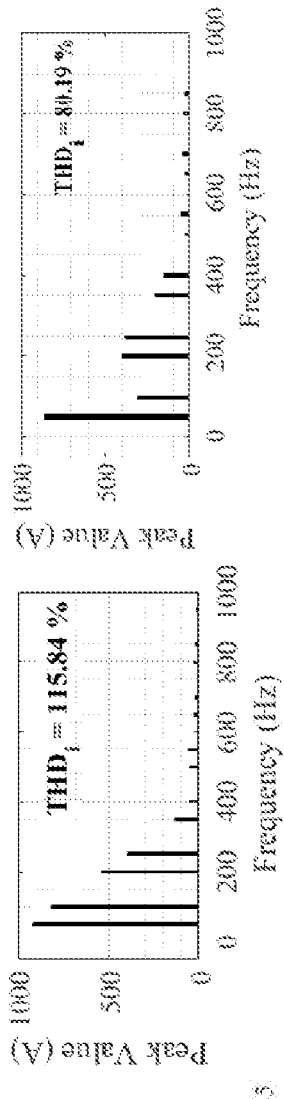
FIG. 8G
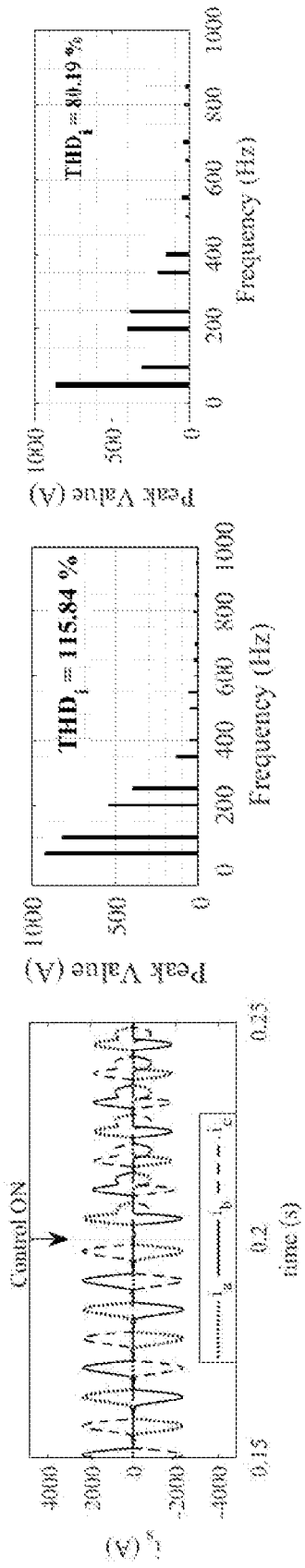
FIG. 8H
FIG. 8I
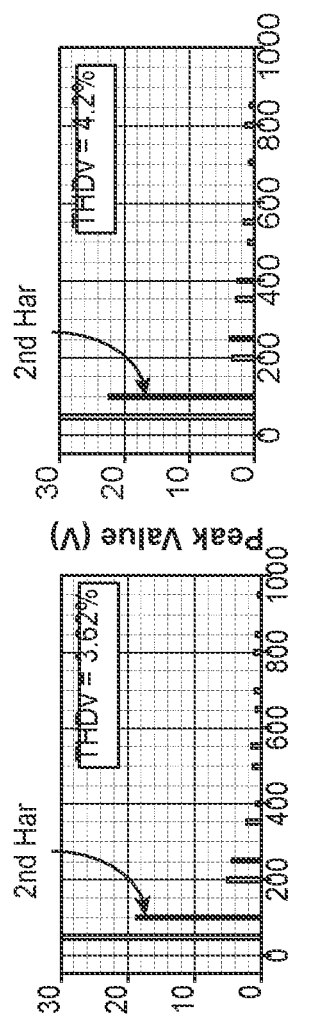
FIG. 8J
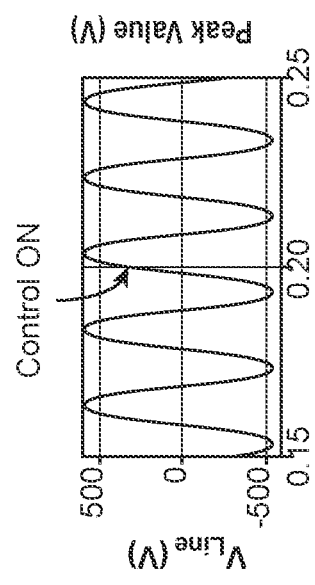
FIG. 8K
FIG. 8L

SWITCH CONTROL METHOD TO SUPPRESS THE EFFECT OF EVEN ORDER HARMONICS IN SUPPLY VOLTAGE ON ASD

CROSS-REFERENCE TO RELATED APPLICATION

This application claims foreign priority benefits under U.S.C. § 119 to Indian Patent Application No. 202141044858 filed on Oct. 4, 2021, the content of which is hereby incorporated by reference in its entirety.

TECHNICAL FIELD

The present disclosure relates to electrical power converters and in particular to the control of AC-DC power converters.

BACKGROUND

Electric supply voltage sometimes comes with superimposed harmonics of different frequencies other than the fundamental. It has been observed that even-ordered harmonics are present in the supply voltage and the magnitude is not negligible. Further, it has been found that the lower order harmonics are of greater concern than the higher order, considering the ripple current flowing through the DC bus capacitor of an AC-DC converter. It was also found that the angle of harmonics has an impact on the DC bus capacitor current. Since, the angle of harmonics also changes the capacitor current, Total Harmonic Distortion ($THD_v$) is not a suitable indicator to map the effect of even harmonics on capacitor current because THD calculation is based on harmonics magnitude only, it does not take into account phase angle information.

There are few solutions developed to address the effect of even harmonics such as Electronic Inductor, modified Dynamic Voltage Restorer (DVR) and Active front end ASD that will also suppress the effect of even harmonics on the drive, with cost of additional components such as switches, gate drivers, sensors, transformers, etc. Hence, the existing solutions are costly and also introduce high frequency components (switching frequency) in the line current.

The European patent EP2312739B1 discusses a method for determining a pulse pattern of a multi-level inverter system for a motor drive. JP4673174B2 describes a controller for a semiconductor switch installed in a power system which has an even harmonics detection means detecting information about amplitude and a phase of an even harmonics voltage component included in an alternating voltage impressed to the semiconductor switch, a direct current component estimation means and a modulation means modulating a control angle of the semiconductor switch for adjusting ignition timing so that the direct current component becomes zero based on the estimated value of the direct current component estimated by the direct current component estimation means. The U.S. Pat. No. 7,148,661B2 depicts an AC to DC converter with harmonic suppression that forces an instantaneous current conflict between series connected rectifier bridges, such that a voltage waveform at 6 times the AC supply frequency of the AC supply is automatically generated. This waveform is then injected via an injection circuit to give harmonic cancellation. U.S. Pat. No. 7,495,938B2 discloses a Three-level inverter and rectifier power conversion systems and space vector modulation (SVM) controls having even-order harmonic elimination for neutral voltage balancing with a predefined vector switching sequences for half-wave symmetry in open loop system operation.

The invention focuses on solving the problem of harmful effects of even-order harmonics in input supply voltage in a cost effective way. Systems and methods are disclosed that may overcome the drawbacks in the existing art.

SUMMARY

In various embodiments a control method of operating a controlled bridge rectifier in a system is disclosed. The method includes providing a drive system with a power source, a DC and/or AC choke, an input controlled bridge rectifier circuit comprising upper leg semiconductor switches, lower leg semiconductor switches, a DC bus comprising a DC capacitor, and one or more controllers to trigger the upper leg semiconductor switches or the lower leg semiconductor switches or both at predetermined angles. Further the method includes estimating a measure of even ordered harmonics present in a supply voltage and suppressing the effects of even order harmonics present in the supply voltage on the DC bus capacitor by triggering the upper leg switches and the lower leg switches at different predetermined angles.

In various embodiments the method includes estimating the measure of even ordered harmonics present in the supply voltage that includes obtaining the magnitude and phase angle of one or more frequency components of voltage ($v_{dc}$) measured across the DC bus. In some embodiments the magnitude and phase angle of the DC bus voltage ($v_{dc}$) is obtained at a frequency that is thrice the supply frequency.

In various embodiments the method includes triggering the upper leg switches at a first predetermined angle and the lower leg switches at a second predetermined angle if the magnitude of one or more frequency components of DC bus voltage ($v_{dc}$) is greater than a pre-set threshold magnitude and if the phase angle is less than a threshold angle or triggering the upper leg switches at the second predetermined angle and lower leg switches at the first predetermined angle if the magnitude is greater than a pre-set threshold magnitude and if the phase angle is greater than the threshold angle.

In various embodiments the pre-set threshold magnitude is a function of a resultant capacitor ripple current. In various embodiments the first predetermined angle is in a range 0° to 45°. In various embodiments the second predetermined angle is in a range 0° to 45°.

In various embodiments the method includes estimating the measure of even ordered harmonics present in the supply voltage that includes calculating an Asymmetry Factor (AF) value of a supply voltage ($v_{line}$) using $$AF = \frac{||V_{pos\_peak}| - |V_{neg\_peak}||}{V_{rms}},$$

wherein $V_{pos\_peak}$ is the positive peak voltage, $V_{neg\_peak}$ is the negative peak voltage and $V_{rms}$ is the root mean square value of the supply voltage.

In various embodiments the method includes triggering the upper leg switches at a third predetermined angle and the lower leg switches at a fourth predetermined angle if the AF is more than a threshold, and the positive peak value of $v_{line}$ is more than an absolute value of the negative peak value of $v_{line}$ or triggering the upper leg switches at the fourth predetermined angle and the lower leg switches at the third predetermined angle if the AF is more than the threshold, and the positive peak value of $v_{line}$ is less than the absolute value of the negative peak of $v_{line}$.

In various embodiments the method includes triggering the upper leg switches at the third predetermined angle and the lower leg switches at the fourth predetermined angle if the AF is less than the threshold and if an average value of Zero Cross Detector (ZCD) is less than a first ZCD threshold value or triggering the upper leg switches at the fourth predetermined angle and the lower leg switches at the third predetermined angle if the AF is less than the threshold and if the average value of ZCD is more than a second ZCD threshold value. In various embodiments the third predetermined angle is in a range 0 to 45°. In various embodiments the fourth predetermined angle is in a range 0° to 45°.

In various embodiments the threshold for AF is a lower value below a threshold required to protect the DC bus capacitor. In various embodiments the first ZCD threshold is a higher value above a threshold required to protect the DC bus capacitor. In various embodiments the second ZCD threshold angle is a lower value below a threshold required to protect the DC bus capacitor.

BRIEF DESCRIPTION OF THE DRAWINGS

The invention has other advantages and features, which will be more readily apparent from the following detailed description of the invention and the appended claims, when taken in conjunction with the accompanying drawings, in which:

FIG. 8A shows the instantaneous waveform of the DC bus voltage $v_{dc}$ with $R_{SCE}=100$ and under $2^{nd}$ order harmonics=4% at 0°, FIG. 8B shows the spectrum of the DC bus voltage $v_{dc}$ in the frequency domain without control logic, FIG. 8C shows the spectrum of the DC bus voltage $v_{dc}$ in the frequency domain with control logic.

FIG. 8D shows the instantaneous waveform of the capacitor current $i_c$ with $R_{SCE}=100$ and under $2^{nd}$ order harmonics=4% at 0°, FIG. 8E shows the spectrum of the capacitor current $i_c$ in the frequency domain without control logic, FIG. 8F shows the spectrum of the capacitor current $i_c$ in the frequency domain with control logic.

FIG. 8G shows the instantaneous waveform of the line current $i_s$ with $R_{SCE}=100$ and under $2^{nd}$ order harmonics=4% at 0°, FIG. 8H shows the spectrum of the line current $i_s$ in the frequency domain without control logic, FIG. 8I shows the spectrum of the line current $i_s$ with control logic.

FIG. 8J shows the instantaneous waveform of the line voltage $v_{line}$ with $R_{SCE}=100$ and under $2^{nd}$ order harmonics=4% at 0°, FIG. 8K shows the spectrum of the line voltage $v_{line}$ in the frequency domain without control logic, FIG. 8L shows the spectrum of the line voltage $v_{line}$ in the frequency domain with control logic.

DETAILED DESCRIPTION

Figure 1:
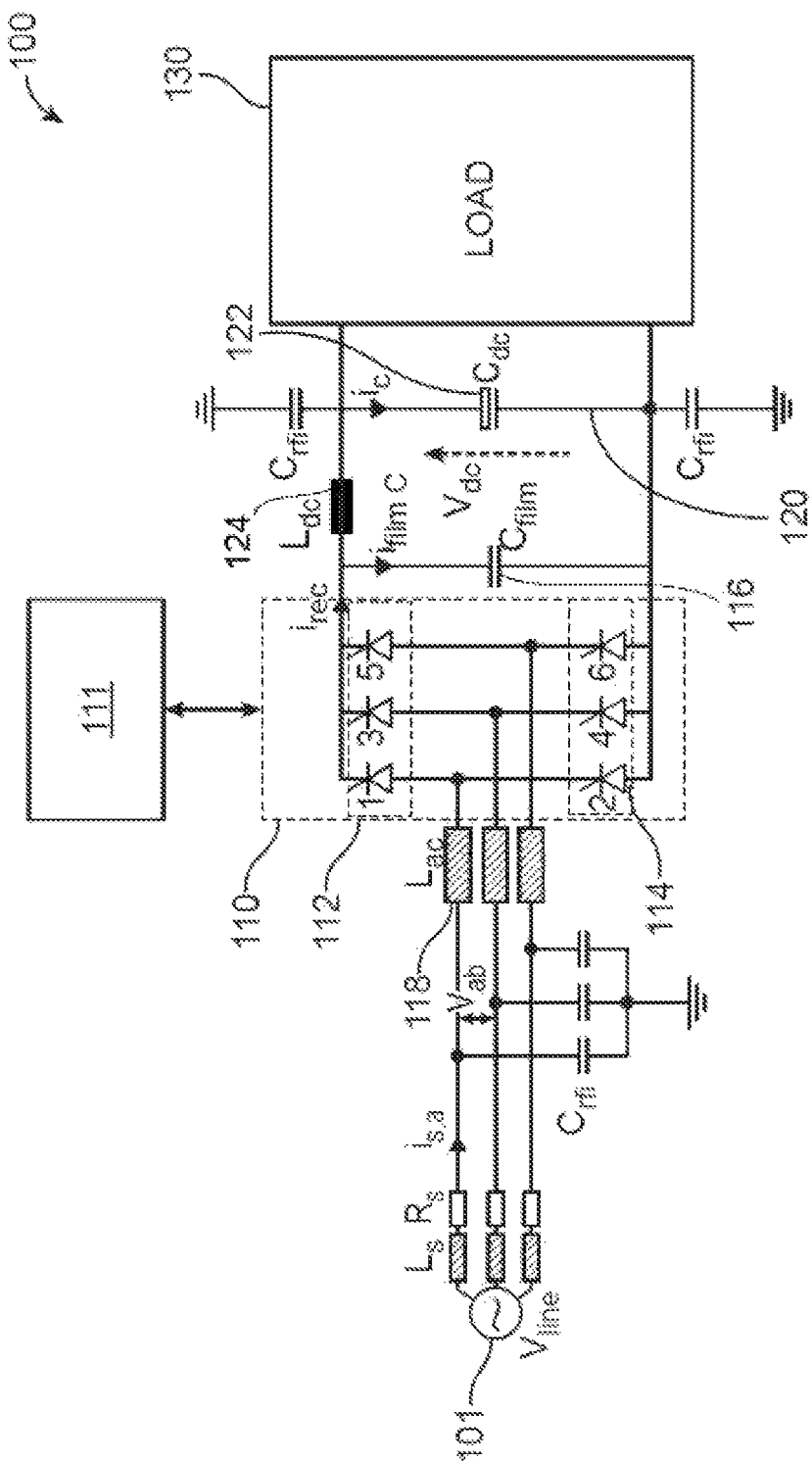
FIG. 1 shows the schematic of ASD with load.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present subject matter discloses systems, devices, and methods for reducing the harmful effects of even-order harmonics in supply voltage on the DC side components in semiconductor device based front end of an Adjustable Speed Drive (ASD). In one embodiment the system may be an AC to DC converter topology that may possess an inductor in the AC or DC or both (AC and DC) sides. In another embodiment the system may also be an AC to DC converter feeding any power electronic load. The method involves modifying the time of triggering the various semiconductor switches through a control logic arrived at through either measuring the DC bus voltage ($v_{dc}$) or the input AC voltage ($v_{line}$). The method is further disclosed with reference to the drawings.

In various embodiments, the system 100 as illustrated in FIG. 1 is a rectifier based ASD system that includes a power supply 101, a DC and/or AC choke 118, an input bridge rectifier circuit 110 having upper leg switches 112 and lower leg switches 114, an inductor $L_{dc}$ that is part of a filter 124, a film capacitor 116, a DC bus 120 having a DC capacitor 122, an output inverter circuit 130 and one or more controllers 111 to trigger the upper leg switches 112 and the lower leg switches 114 at predetermined angles. The power supply 101 may be one, two, three or multiple phase power supply. The power supply is configured to provide a line current $i_s$ and a line voltage $v_{line}$ to the system. In one embodiment the input bridge rectifier 110 is a fully controlled bridge rectifier. In another embodiment the input bridge rectifier 110 is a half controlled bridge rectifier.

The upper leg switches 112 and the lower leg switches 114 in the controlled rectifier circuit 110 may include thyristors, SCRs, IGBTs or diodes. In one embodiment the upper leg switches 112 may include three thyristors 1,3,5 or SCRs 1,3,5 and the lower leg switches 114 may include three thyristors 2,4,6 or SCRs 2,4,6. In another embodiment the upper leg switches 112 may include three IGBTs 1,3,5 and the lower leg switches 114 may include three IGBTs 2,4,6. In another embodiment the upper leg switches 112 may include three thyristors 1,3,5 or SCRs and the lower leg switches 114 may include three diodes 2,4,6 or vice versa. The upper leg switches 112 may not be limited to three switches or diodes but may be any number, based on the number of supply phases. The lower leg switches 114 may not be limited to three switches or diodes but may be any number, based on the number of supply phases. A rectifier current $i_{rec}$ flows out of the input controlled bridge rectifier 110. The voltage across the DC bus 120 is $v_{dc}$ and a capacitor current $i_c$ flows through the bus. The harmonic distortion in the line voltage produces an increase in the ripple current through the capacitor. The angle of harmonics also changes the capacitor current $i_c$.

In various embodiments the one or more controllers are configured to trigger the upper leg switches 112 and lower leg switches 114 at predetermined angles to overcome the effects of even order harmonics present in the supply voltage ($v_{line}$). In one embodiment one controller may trigger the switches in the upper leg 112 and the lower leg 114. In another embodiment one controller may trigger the switches in the upper leg 112 and another controller may trigger the switches in the lower leg 114. In various embodiments the triggering of the upper leg switches 112 and lower leg switches 114 at predetermined angles reduces the ripples in the capacitor current $i_c$ and also reduces the total harmonic distortion ($THD_i$) in the line current and the peak value of the line current $i_s$.

Figure 2:
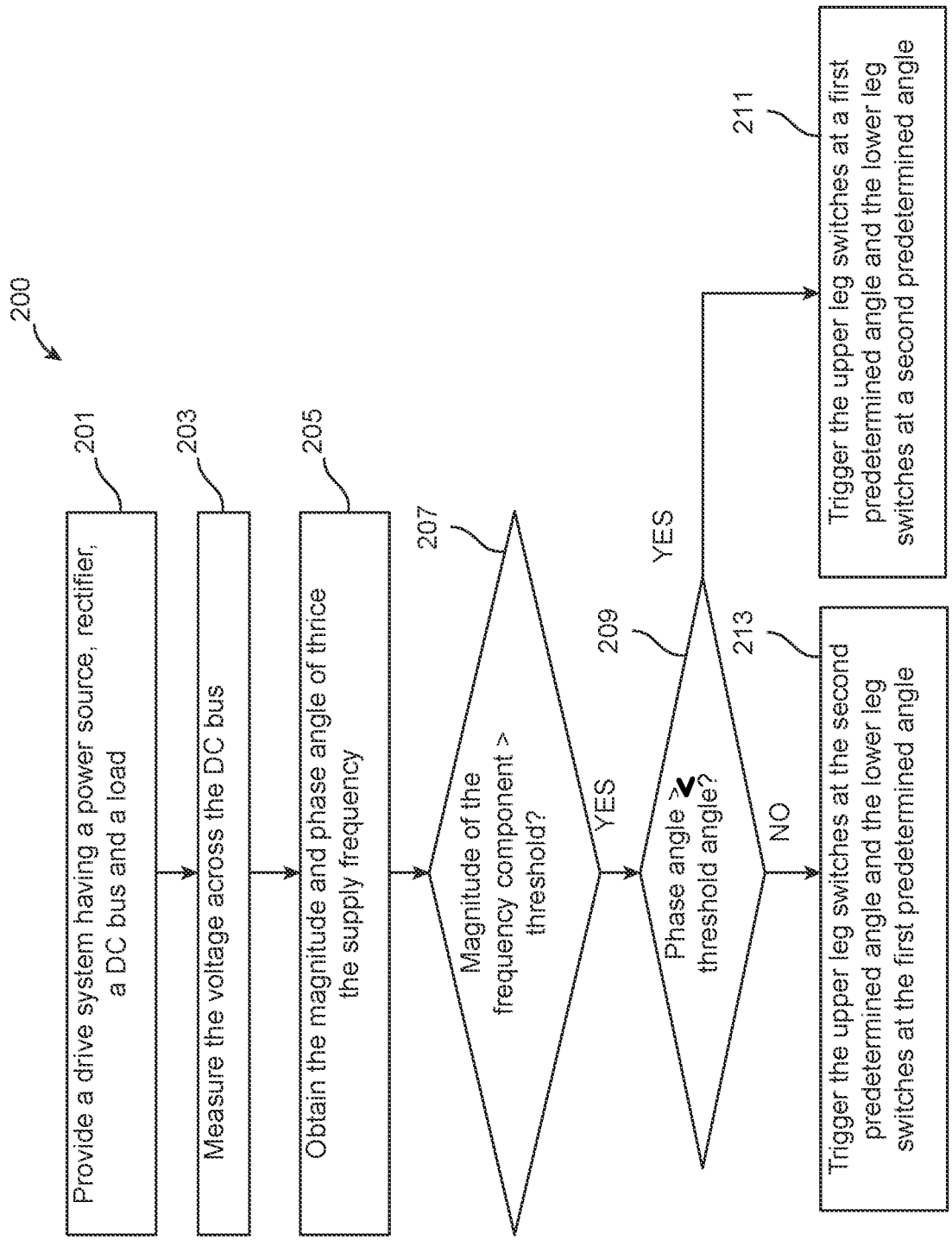
FIG. 2 shows a method-1 for the control of switches to minimize effect of even order harmonics.

In one aspect the subject matter is a control method 200 of operating a controlled bridge rectifier in a drive system. The method as illustrated in FIG. 2 requires the measurement of the DC bus voltage ($v_{dc}$) in step 203. In one embodiment in step 205 the magnitude and phase angle of one or more frequency components of the DC bus voltage ($v_{dc}$) is obtained. The measure of phase angle of one or more frequency components of the DC bus voltage ($v_{dc}$) is obtained with respect to a zero crossing of line voltage ($v_{line}$) from the power source. In an exemplary embodiment the magnitude and phase angle of the frequency component of the DC bus voltage ($v_{dc}$) that is three times the frequency of the supply voltage is obtained. In various embodiments the magnitude and phase angle of the one or more frequency components are obtained by calculating Fast Fourier Transform (FFT) of the DC bus voltage.

The method in step 207 further includes comparing the magnitude of the frequency component with a set threshold magnitude ($\alpha$). In various embodiments the set threshold magnitude ($\alpha$) is based on the tolerable limit of even harmonics in the supply. If the magnitude of the frequency component is greater than the threshold ($\alpha$) then in step 209 the phase angle is compared against a threshold angle ($\beta$). In various embodiments the set threshold phase angle ($\beta$) is based on the response of the drive system to the upper/lower leg switches triggered at different angles, and the inductor and capacitor values of the drive. In one embodiment in step 211 if the phase angle of the DC bus voltage is less than the threshold angle ($\beta$) then the upper leg switches in the drive system are triggered at a first predetermined angle ($\gamma$) and the lower leg switches are triggered at a second predetermined angle ($\delta$). In another embodiment in step 213 if the phase angle of the DC bus voltage is greater than the threshold angle ($\beta$) then the upper leg switches in the drive system are fired at a second predetermined angle ($\delta$) and the lower leg switches are fired at the first predetermined angle ($\gamma$). The first predetermined angle ($\gamma$) is in a range 0° to 45° and the second predetermined angle ($\delta$) is in a range 0° to 45°.

In an exemplary embodiment the triggering of the upper leg and lower leg switches in the predetermined angles is capable of reducing ripple current through the capacitor ($i_c$).

In another aspect a control method 300 of operating the bridge rectifier in a drive system is disclosed. The method includes measuring the supply voltage at the drive's input terminal. The method is capable of quantifying the extent of even order harmonics in the supply voltage. The control method is based on the positive peak and negative values, and the half-cycle average value (Zero Crossing Detector—ZCD output) of the line voltage, the control action is taken as in FIG. 3.

Figure 3:
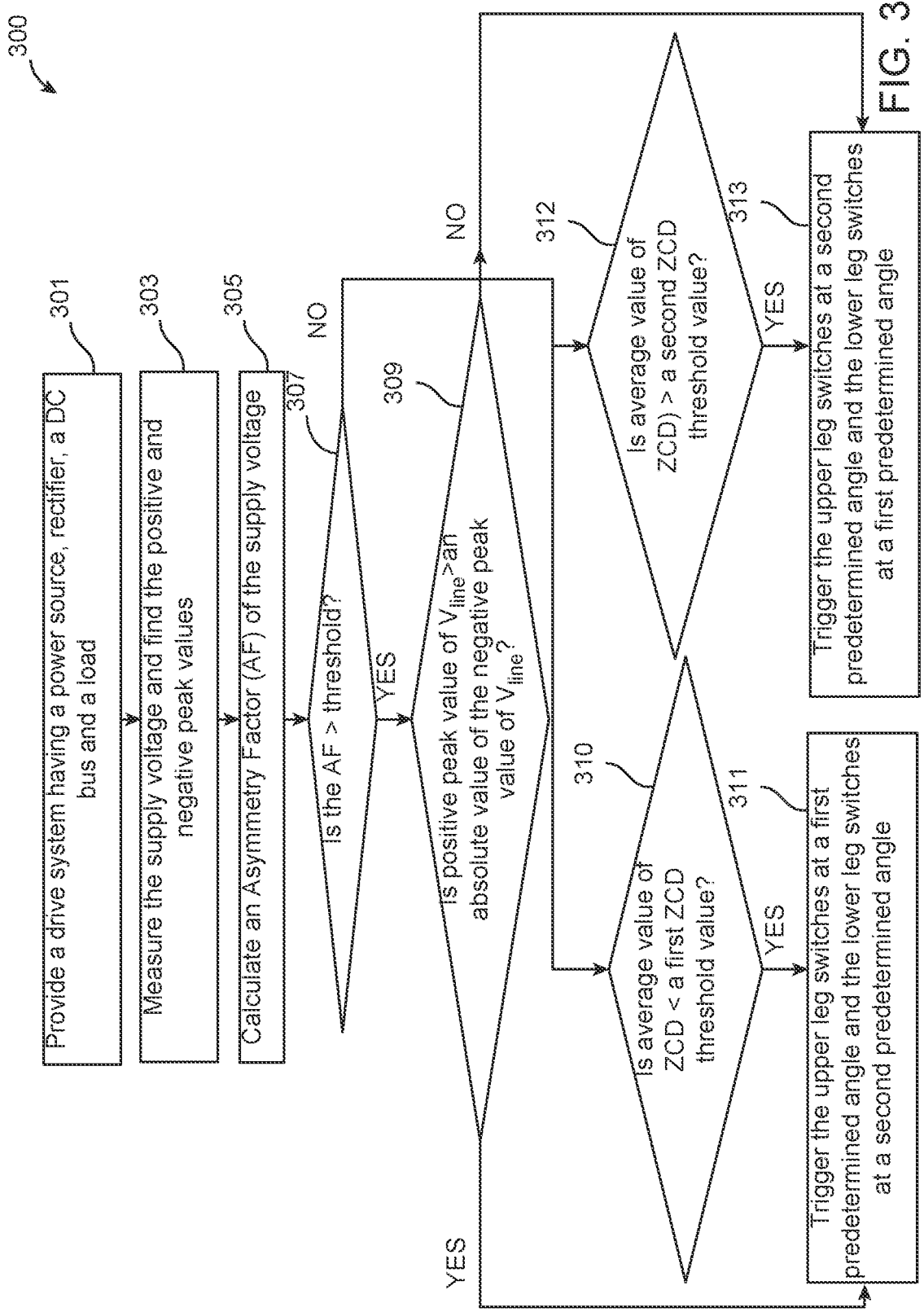
FIG. 3 shows a method-2 for the control of switches to minimize effect of even order harmonics.

In various embodiments, the control algorithm involves the following steps as illustrated in FIG. 3. In step 303 the method includes measuring the supply voltage ($v_{line}$) from the power source and finding its positive peak and negative peak values. Even order harmonics in the supply voltage ($v_{line}$) results in asymmetry in the supply voltage waveform and hence positive and negative peak differs and this can be measured using Asymmetry Factor (AF). The Asymmetry Factor (AF) of the line voltage is calculated in step 305. The AF is given by:

$$AF = \frac{||V_{pos\_peak}| - |V_{neg\_peak}||}{V_{rms}} \quad (1)$$

where $V_{pos\_peak}$ is the positive peak of line voltage, $V_{neg\_peak}$ is the negative peak of line voltage and $V_{rms}$ is the rms value of the line voltage. AF is calculated based on the positive and negative peak values of voltage waveform, which is the result of the combination of magnitude and phase angle of even order harmonics. It means that the AF incorporates the effect of magnitude and angle variation of even order harmonics on the capacitor current.

In step 307 the AF is compared with a threshold ($\lambda$) that is preset. If the AF is more than $\lambda$ and in step 309 if the positive peak value of $v_{line}$ is more than the absolute value of the negative peak of $v_{line}$, then in step 311 the upper leg switches are triggered at the first predetermined angle ($\gamma$) and the lower leg switches are triggered at the second predetermined angle ($\delta$). In step 309 if the positive peak value of $v_{line}$ is less than the absolute value of the negative peak of $v_{line}$, then in step 313 the upper leg switches are triggered at the second predetermined angle ($\delta$) and the lower leg switches are triggered at the first predetermined angle ($\gamma$).

In some embodiments in the waveform asymmetry calculation, the positive and negative peak values may be the same and hence the AF is nearly zero. In such cases the asymmetry in the waveform may be obtained by the average value of ZCD. This is termed as Asymmetry Index (AI), given by $$AI = AF + 2.5 \times |(0.5 - ZCD_{avg})| \quad (2)$$

In one aspect if the $ZCD_{avg}$ value is 0.5, then the waveform possess half wave symmetry and hence no asymmetry. In another aspect if the $ZCD_{avg}$ value is deviated from 0.5, then the level of deviation will measure the asymmetry in the waveform. In some embodiments in step 307 if the AF is less than $\lambda$, then in step 310 the average value of ZCD is compared with a first ZCD threshold ($\sigma$). If the average value of ZCD is less than $\sigma$, then in step 311 the upper leg switches are triggered at the first predetermined angle ($\gamma$) and the lower leg switches at the second predetermined angle ($\delta$). In some embodiments in step 307 if the AF is less than $\lambda$, then in step 312 the average value of ZCD is compared with a second ZCD threshold ($\tau$) that is pre-set. If the average value of ZCD is more than r, then in step 313 the upper leg switches are triggered at the second predetermined angle ($\delta$) and the lower leg switches at the first predetermined angle ($\gamma$).

The disclosed control methods maybe used in any power products where full bridge or half bridge configuration is used. The proposed control methods may also be used in the ASDs where full bridge or half bridge controlled rectifier system is used. In such configuration, with the same control methods, the effect of even-order harmonics maybe suppressed.

The following advantages are seen in the proposed control methods. The proposed method reduces the stress on the DC bus capacitor and increases the lifetime of the capacitor. It further reduces the peak current through the device, which reduces stress on the rectifier components. Also, it reduces thermal stress on the inductors present in the AC side or DC side or a combination of AC and DC sides. The method also improves harmonic current performance (reduced $THD_i$) on the grid side.

EXAMPLES

Figure 4:
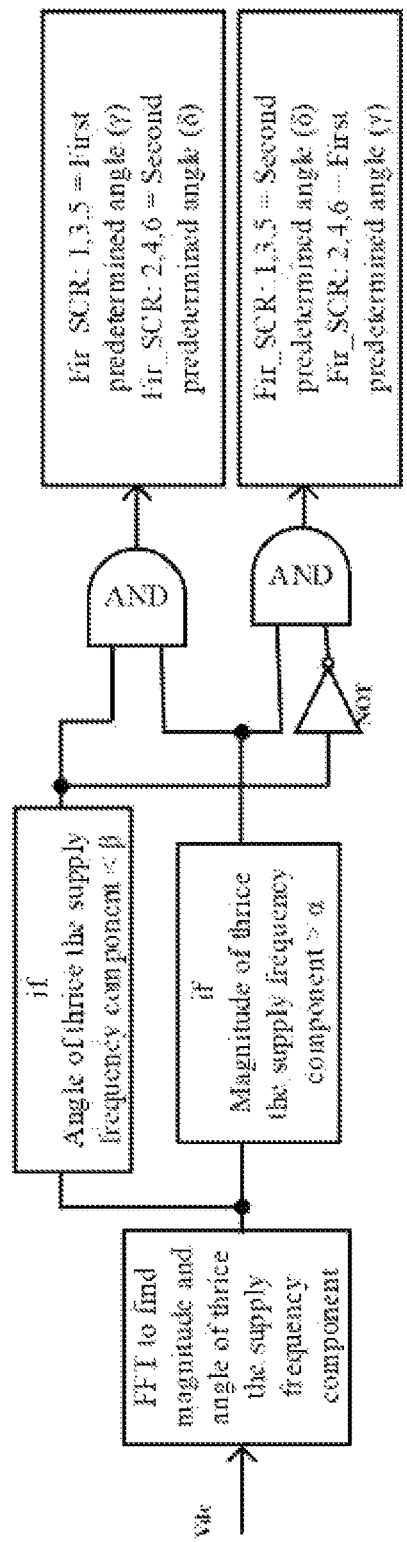
FIG. 4 shows the applicability of the control method-1 to a three-phase fully controlled AC to DC converter.
Figure 5:
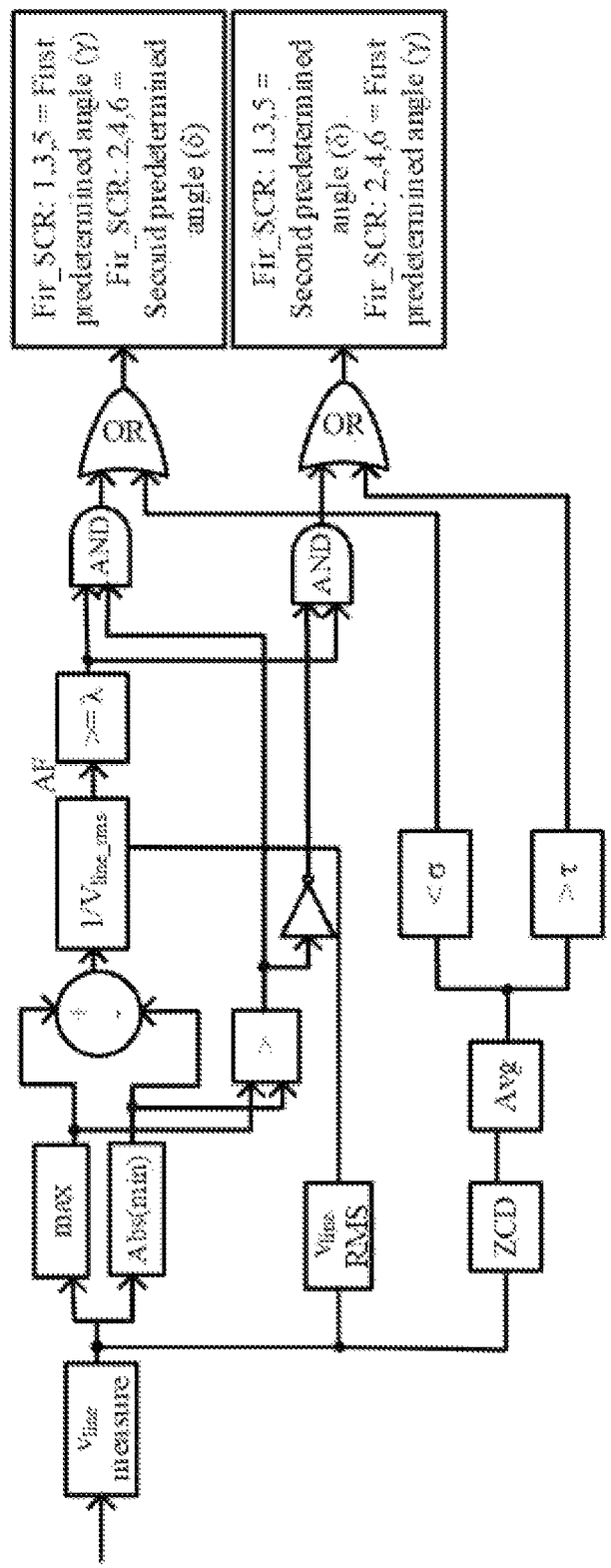
FIG. 5 shows the applicability of the control method-2 to a three-phase fully controlled AC to DC converter.

Example. 1: Performance Evaluation of Proposed Control Methods with Thyristors in the Upper Leg and the Lower Leg A 540 kW drive was considered. The control methods for the 540 kW drive is implemented as shown in FIG. 4 and FIG. 5. The rectifier is a full bridge rectifier with three thyristors in the upper leg and three thyristors in the lower leg. The system parameters of the drive system are specified in Table. 1.

TABLE 1

System Parameters of the Drive System

| Parameters | Value |
| --- | --- |
| AC choke, $L_{ac}$ | 27 µH |
| DC link capacitance, $C_{dc}$ | 20.8 mF |
| Rated line voltage, $V_{line}$ | 400 V |
| Load Motor | 540 kW, 400 V, 50 Hz, Induction motor |

PQ meters were installed at different industrial sites for a considerable duration (around 3 months in each site) to understand the harmonics spectrum of the supply/line voltage at each site. It was observed that even order harmonics are present in the supply voltage at most of the sites and the magnitude is crossing the IEC 61000-2-2 limit. In our study, we found that the lower order harmonics create more impact than the higher order, considering the ripple current flowing through the DC bus capacitor. Hence the lower order harmonics ($2^{nd}$ and $4^{th}$) are given importance. The maximum magnitude of $2^{nd}$ and $4^{th}$ order harmonic recorded up to 4%. The angle of harmonics also has an impact on the DC bus capacitor current. Hence, the angle of harmonics were also considered in this study. Both control methods ensured the same level of performance, so results shown are not distinguished based on different control method.

Performance Indices: Even Order Harmonics and its Effect on Capacitor:

Since, the angle of harmonics also changes the capacitor current, therefore, Total Harmonic Distortion ($THD_v$) is not a suitable indicator to map the effect of even harmonics on capacitor current. Because THD calculation is based on harmonics magnitude only, it does not take account phase angle information as given in (3).

$$THD_v(\%) = \frac{\sqrt{\sum_{h=2}^{40} v_h^2}}{V_1} \times 100\% \quad (3)$$

Therefore, two performance indices have been defined to assess the even order harmonics severity in the supply voltage and then estimate their effect on DC bus capacitors in the frequency converters.

Asymmetry Factor (AF) and Asymmetry Index (AI)—to Assess Even Order Harmonics in the Supply Voltage Even order harmonics result in asymmetry in the supply voltage waveform and hence positive and negative peak differ and this can be measured using Asymmetry Factor (AF) as defined in (1). The proposed index, AF is calculated based on the positive and negative peak values of voltage waveform, which is result of combination of magnitude and phase angle of even order harmonics. It means that the AF incorporates the effect of magnitude and angle variation of even order harmonics, and hence it is used in this study to correlate the effect on capacitor current. Also, there is another index which can be used for the assessment of even harmonics level, which is Asymmetry Index (AI), as calculated in (2). In the waveform asymmetry calculation, there are few cases where the positive and negative peak values may be the same and hence the AF will be nearly zero. But, there exist asymmetry in the waveform and which can be obtained by the average value of Zero Crossing Detector (ZCD). The ZCD output is 1 when the voltage is positive and 0 when the voltage is negative. If the $ZCD_{avg}$ value is 0.5, then the waveform possess half wave symmetry and hence no asymmetry. If the $ZCD_{avg}$ value is deviated from 0.5, then the level of deviation will measure the asymmetry in the waveform. This is used in the expression along with AF, as in (2).

Capacitor Heating Factor (CHF)—to Assess the Stress on the DC Bus Capacitor

In order to assess the stress on the DC bus capacitor due to the ripple current, it is required to con-sider all the frequency component that are flowing through the capacitor. A term called 'Capacitor Heating Factor' (CHF) (4), is introduced to assess this effect, given by:

$$CHF = \sqrt{\sum_{n=1}^{\infty} \frac{I_n^2}{M_{f,n}^2}} \quad (4)$$

In (4), $M_{f,n}$ is the ripple current multiplication factor which can be obtained from capacitor datasheet. For the CHF calculation, the upper frequency limit is considered based on the switching frequency of the drive. In the example considered, the switching frequency is 2 kHz and hence the upper frequency limit is selected as 3 kHz.

With Stiff Grid Condition (Short Circuit Ratio ($R_{SCE}$)=1200)

For simplicity, here only one sample case is shown. The $2^{nd}$ harmonics of 4% magnitude at an angle of 0° is introduced in the supply voltage.

Figure 6A:
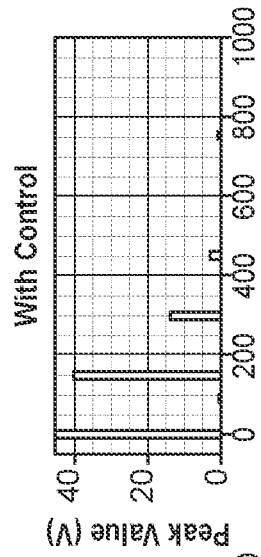
FIG. 6A shows the instantaneous waveform of the DC bus voltage $v_{dc}$ with $R_{SCE}=1200$ and under $2^{nd}$ order harmonics=4% at 0°.
Figure 6B:
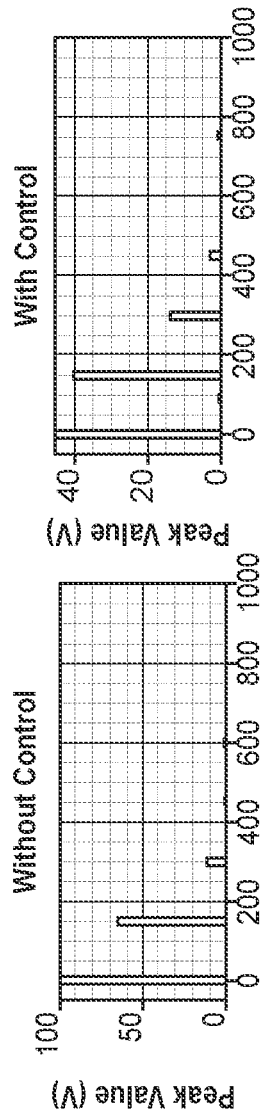
FIG. 6B shows the spectrum of the DC bus voltage $v_{dc}$ in the frequency domain without control logic.
Figure 6C:
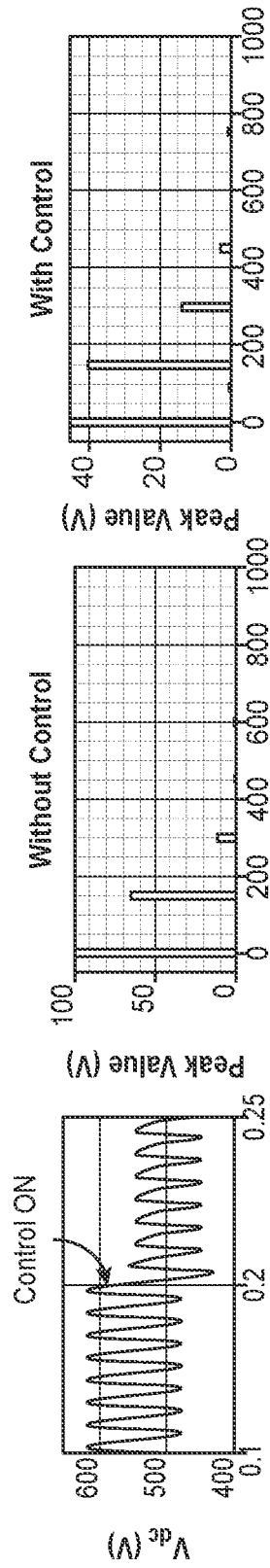
FIG. 6C shows the spectrum of the DC bus voltage $v_{dc}$ in the frequency domain with control logic.
Figure 6D:
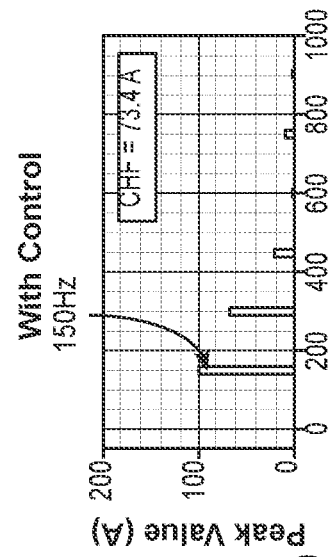
FIG. 6D shows the instantaneous waveform of the capacitor current $i_c$ with $R_{SCE}=1200$ and under $2^{nd}$ order harmonics=4% at 0°.
Figure 6E:
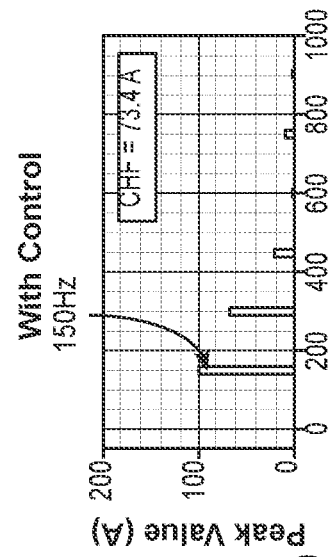
FIG. 6E shows the corresponding spectrum of the capacitor current $i_c$ in the frequency domain without control logic.
Figure 6F:
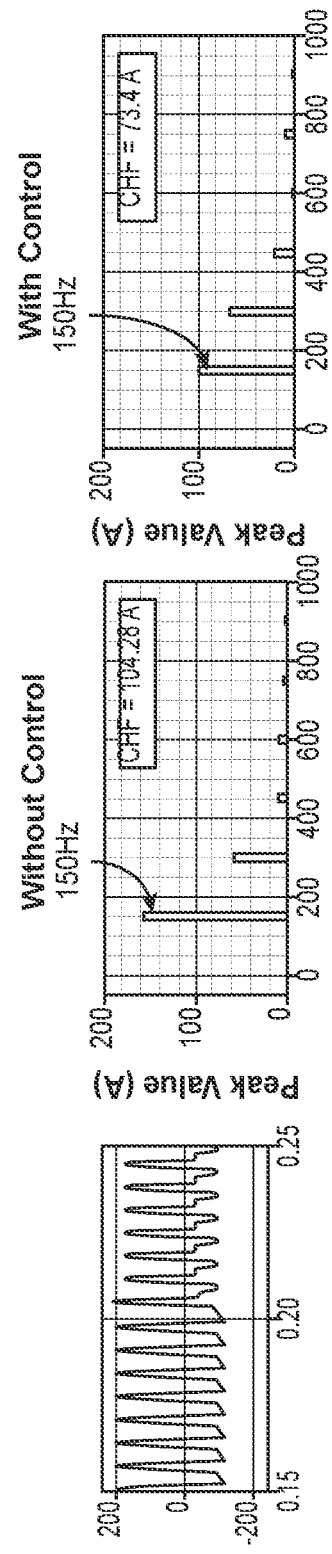
FIG. 6F shows the spectrum of the capacitor current $i_c$ in the frequency domain with control logic.
Figures 6G, 6H, 6I, 6J, 6K, 6L:
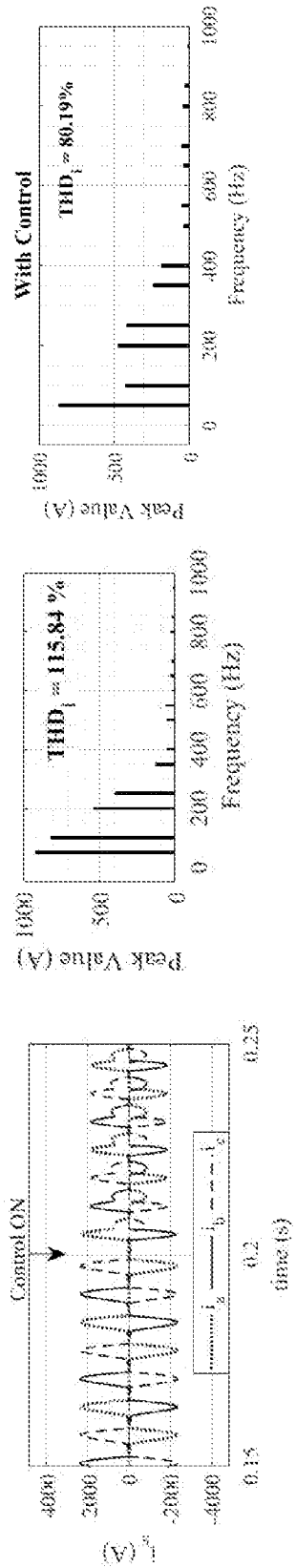
FIG. 6G shows the instantaneous waveform of the line current $i_s$ with $R_{SCE}=1200$ and under $2^{nd}$ order harmonics=4% at 0°.
FIG. 6H shows the corresponding spectrum of the line current $i_c$ in the frequency domain without control logic.
FIG. 6I shows the spectrum of the line current $i_c$ in the frequency domain with control logic.
FIG. 6J shows the instantaneous waveform of the line voltage $v_{line}$ with RSCE=1200 and under $2^{nd}$ order harmonics=4% at 0°.
FIG. 6K shows the spectrum of the line voltage $v_{line}$ in the frequency domain without control logic.
FIG. 6L shows the corresponding spectrum of the line voltage $v_{line}$ in the frequency domain with control logic.

The Control was applied at 0.2 sec as shown in FIG. 6A. FIG. 6A-FIG. 6L shows the DC bus voltage ($v_{dc}$), DC bus capacitor current ($i_c$), line current ($i_s$), and line voltage ($v_{line}$) waveforms along with its FFTs. The CHF value before control was 104.28 A (cf., FIG. 6E). Now, by applying the proposed control logic (triggering the upper leg thyristors, in this case), CHF reduced to 73.4 as shown in FIG. 6F. The instantaneous waveform of the line current is with $R_{SCE}$=1200 and under $2^{nd}$ order harmonics=4% at 0° is shown in FIG. 6G. Moreover, the $THD_i$ of line current ($i_s$) reduced from 121.78% to 95.49% as shown in FIGS. 6H and 6I with proposed control, due to reduction of magnitude of the $2^{nd}$ order harmonic component in the line current. Further, the application of control did not show any abnormal behaviour in the dynamic performance.

Figures 7A, 7B:
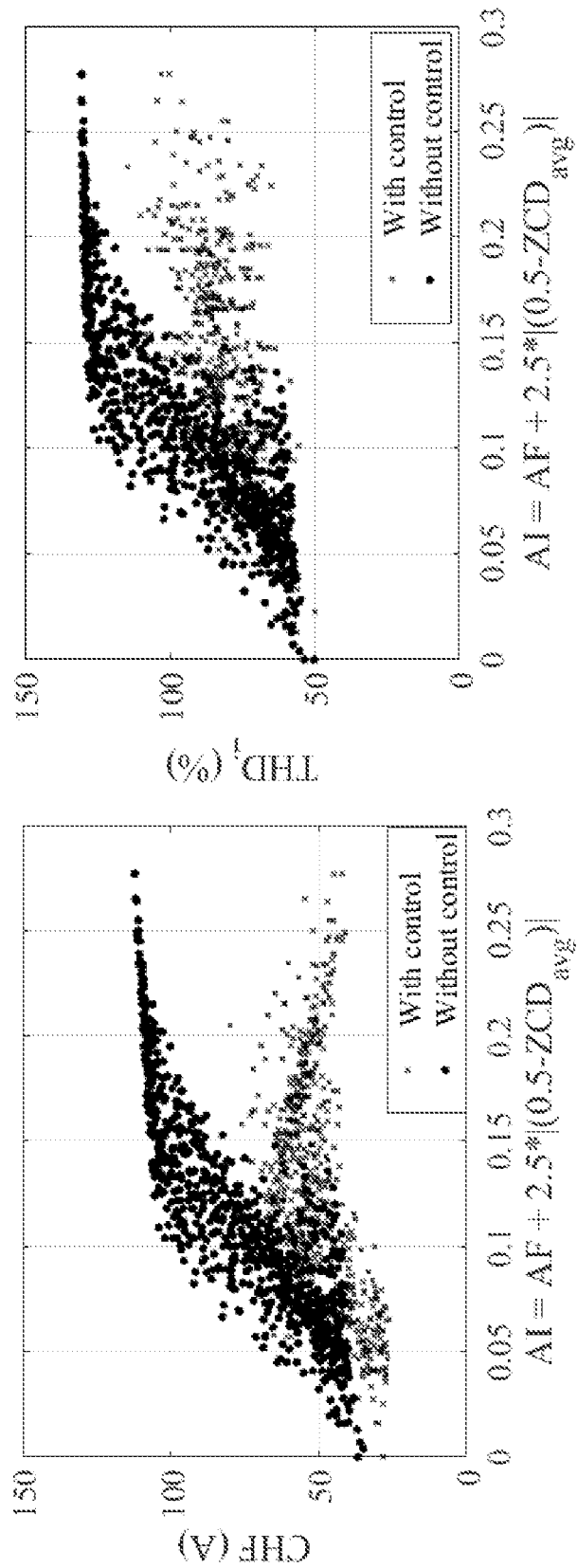
FIG. 7A shows the CIF comparison of proposed control for a large set of even harmonics with and without control under $R_{SCE}=1200$.
FIG. 7B shows the line current $THD_i$ comparison of proposed control for a large set of even harmonics with and without control under $R_{SCE}=1200$.

For detailed investigation, the proposed control method is evaluated for different combinations of magnitude and phase angle of even order harmonics ($2^{nd}$ and $4^{th}$). For this validation, the harmonics in the input voltage were varied as follows. The $2^{nd}$ order harmonic and $4^{th}$ order harmonic magnitude were varied from 0 to 4% in steps of 1% and angle of harmonics was changed from 0° to 180° in steps of 30°. Hence, overall 1125 combinations were obtained, and all these combinations were simulated with and without control. The CHF values for each case were plotted as shown in FIG. 7A. It shows that with proposed thyristor control the reduced CHF (stress) may be achieved over wide range of $2^{nd}$ and $4^{th}$ order harmonics, which improves the lifetime of DC bus capacitor without derating drive's output performance. Moreover, line current $THD_i$ also improved, which further reduced stress on rectifier's components. The effect of the proposed control on line current $THD_i$ is shown in FIG. 7B.

With Soft Grid Condition ($R_{SCE}$=100 and 33)

In order to analyse the effect of high grid impedance on the performance of proposed thyristor control method, in this study, a grid with an $R_{SCE}$ of 33 and 100 are considered.

A. With $R_{SCE}$=100

Similar to the previous section, the response under a sample case with $2^{nd}$ harmonic of 4% magnitude with an angle of 0° is shown. The drive was simulated with and without control, and the responses are shown in FIG. 8A-8L. It is to be noted that, the line voltage is measured at the drive input terminal (before AC choke), after the grid impedance point. Here the CHF and $THD_i$ reduction with proposed control was achieved from 93.77 A to 60.1 A (cf., FIGS. 8E and 8F) and 115.8% to 80.19% respectively as shown in FIGS. 8H and 8I, which is a significant reduction. Due to thyristor control, there was a slight increase in the line voltage $THD_v$ and this value increased with grid impedance, which can be verified from Table. 2.

Figures 9A, 9B:
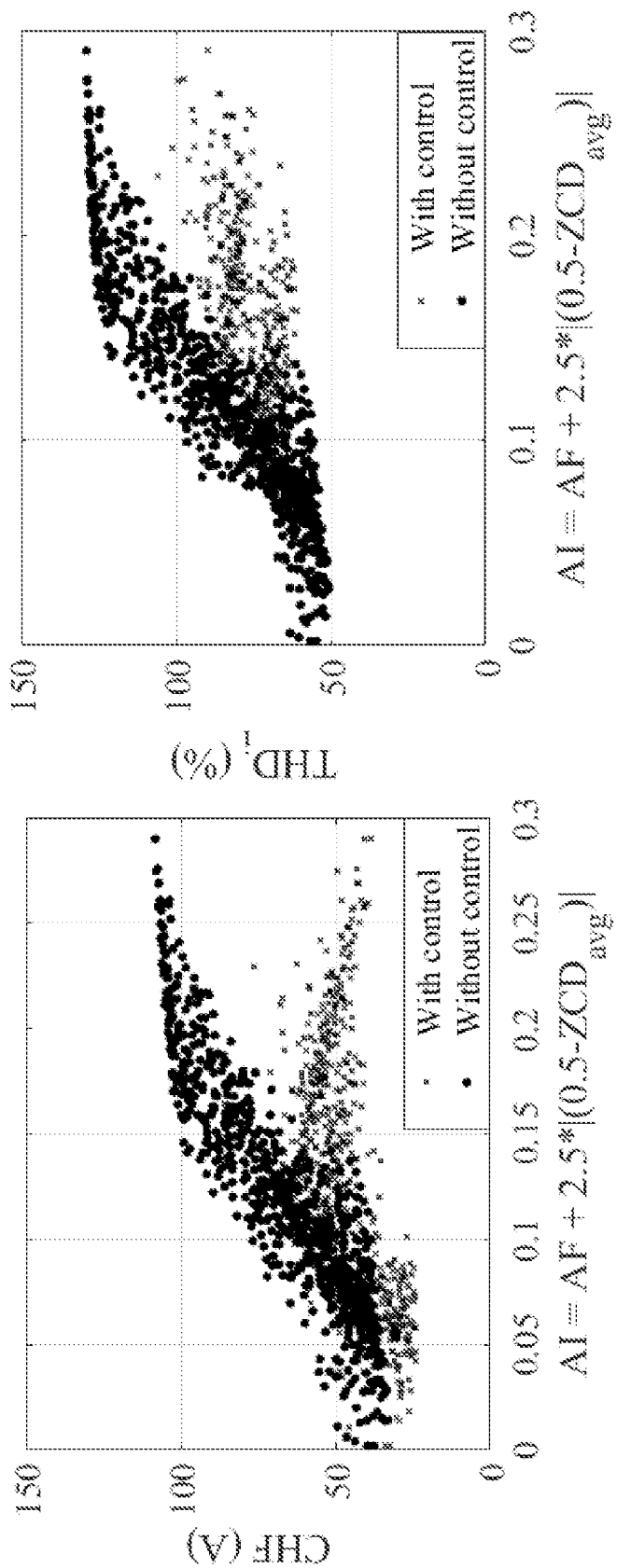
FIG. 9A shows the CHF comparison of proposed control for a large set of even harmonics with and without control under $R_{SCE}=100$.
FIG. 9B shows the line current $THD_i$ comparison of proposed control for a large set of even harmonics with and without control under $R_{SCE}=100$.

Also, the proposed control method was evaluated for different combinations of magnitude and phase angle of even order harmonics ($2^{nd}$ and $4^{th}$), similar to the exercise carried out in the previous section. For this validation, the harmonics in the input voltage were varied as follows. The $2^{nd}$ order harmonic and $4^{th}$ order harmonic magnitude were varied from 0 to 4% in steps of 1% and angle of harmonics was changed from 0° to 180° in steps of 30°. Hence, overall 1125 combinations were obtained, and all these combinations were simulated with and without control. The CHF values for each case were plotted as shown in FIG. 9A. It shows that with proposed thyristor control the reduced CHF (stress) was achieved, which may lead to improved lifetime of DC bus capacitor without derating drive's output performance. Moreover, line current $THD_i$ also improved, which further reduces stress on rectifier's components. The effect of the proposed control on line current $THD_i$ is shown in FIG. 9B. The index used for the assessment of even harmonics level is Asymmetry Index (AI), which is as explained in the previous section.

Figures 10A, 10B:
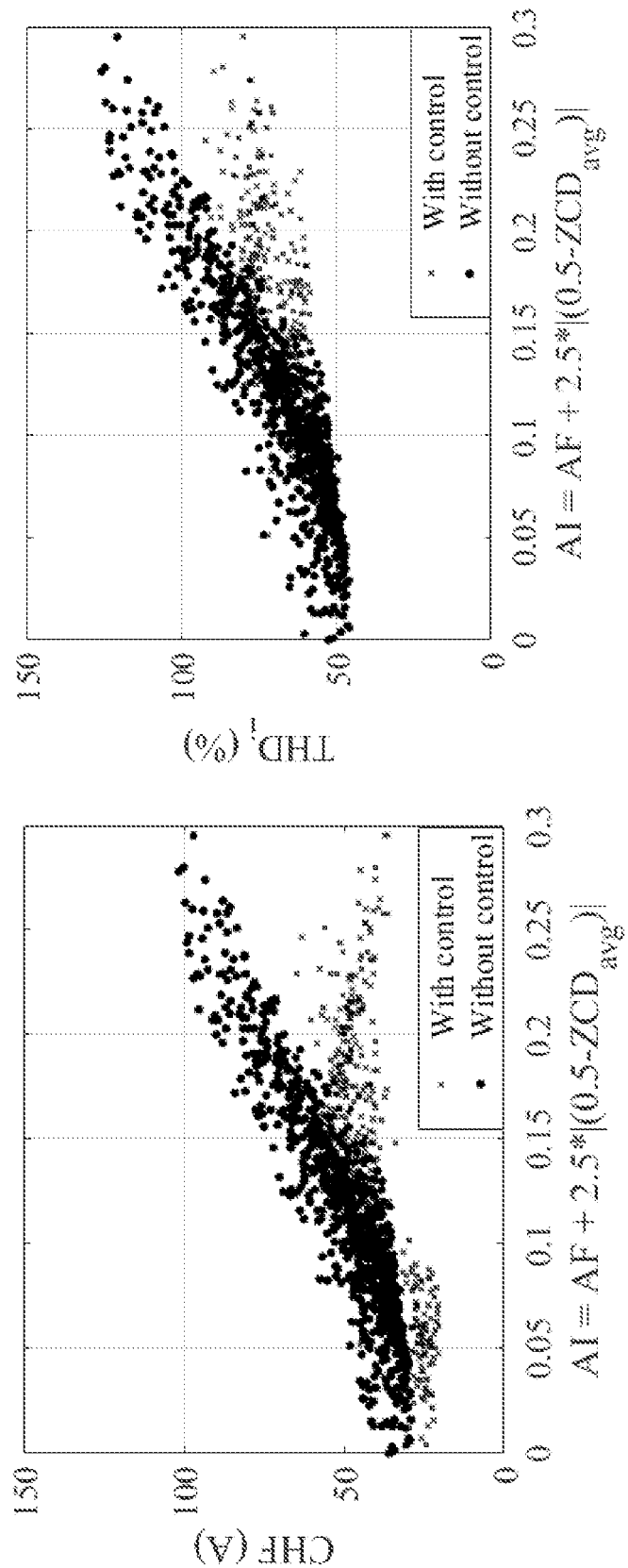
FIG. 10A shows the CIF comparison of proposed control for a large set of even harmonics with and without control under $R_{SCE}=33$.
FIG. 10B shows the line current $THD_i$ comparison of proposed control for a large set of even harmonics with and without control under $R_{SCE}=33$.

With another soft grid condition ($R_{SCE}$=33), the performance of the proposed control is analysed. The same set of harmonic combinations are applied to the ASD with this grid impedance condition and simulated. The CHF values for each case were plotted as shown in FIG. 10A. It shows that with proposed thyristor control the reduced CHF (stress) was achieved, which may improve lifetime of DC bus capacitor without derating drive's output performance. Moreover, line current $THD_i$ also improved, which further reduce stress on rectifier's components. The effect of the proposed control on line current $THD_i$ is shown in FIG. 10B.

With the proposed control, the reduction in CHF values are achievable for any value of grid impedance, which further helps to improve capacitor lifetime. Hence, the proposed thyristor control may give great advantage to improve the robustness and lifetime of DC-link capacitor, and line current harmonics. Also, there is a considerable decrease in the line current $THD_i$, irrespective of any grid impedance, which may be observed from the Table. 2.

TABLE 2

| | | THD$_v$ of Source V (%) | | THD$_i$ of Source Current (%) | | CHF of DC Bus Capacitor (A) | | Useful life of DC Bus Capacitor (k hrs) | |
|---|---|---|---|---|---|---|---|---|---|
| Angle of 2$^{nd}$ harmonics | R$_{SCE}$ | W/o Ctrl. | W Ctrl. | W/o Ctrl. | W Ctrl. | W/o Ctrl. | W Ctrl. | W/o Ctrl. | W Ctrl. |
| 0° | 1200 | 4.00 | 4.04 | 121.78 | 95.49 | 104.3 | 73.4 | NA* | 5 |
| 150 | | 4.00 | 3.95 | 121.01 | 89.01 | 106.5 | 73.0 | NA* | 5 |
| 0° | 100 | 3.62 | 4.20 | 115.84 | 80.19 | 93.8 | 60.1 | NA* | 10 |
| 150 | | 3.89 | 4.03 | 117.20 | 80.60 | 97.6 | 61.0 | NA* | 10 |
| 0° | 33 | 3.42 | 4.93 | 95.96 | 70.75 | 76.4 | 51.8 | <5 | 18 |
| 150 | | 3.76 | 4.66 | 98.01 | 74.60 | 80.2 | 54.5 | <5 | 20 |

Note:
1. Magnitude of 2$^{nd}$ order harmonics was 4%
2. W/o Ctrl. - without control, W Ctrl. - with control
3. NA*—Not Applicable as capacitor manufacturer does not guarantee any lifetime at this high ripple current While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope, which should be as delineated in the appended claims.

The invention claimed is:

1. A control method of operating a controlled bridge rectifier in a system with an input controlled bridge rectifier circuit with upper leg semiconductor switches and lower leg semiconductor switches, a DC bus capacitor, and one or more controllers, the method comprising:
    estimating a measure of even ordered harmonics present in a supply voltage;
    triggering the upper leg switches and the lower leg switches at different predetermined angles by the one or more controllers based on the estimated measure when the estimated measure is greater than a pre-set threshold voltage magnitude; and
    suppressing the effects of even order harmonics present in the supply voltage on the DC bus capacitor;
    wherein estimating the measure of even ordered harmonics present in the supply voltage comprises obtaining the magnitude and phase angle of the voltage (Vdc) measured across the DC bus at a frequency component that is thrice a supply frequency component.

2. The method as claimed in claim 1, wherein the method comprises:
    triggering the upper leg switches at a first predetermined angle and the lower leg switches at a second predetermined angle if the magnitude is greater than the pre-set threshold magnitude and if the phase angle is less than a threshold angle;
    or
    triggering the upper leg switches at the second predetermined angle and the lower leg switches at the first predetermined angle if the magnitude is greater than the pre-set threshold magnitude and if the phase angle is greater than the threshold angle.

3. The method as claimed in claim 2, wherein the pre-set threshold magnitude is a function of a resultant capacitor ripple current.

4. The method as claimed in claim 2, wherein the first predetermined angle is in a range 0° to 45°.

5. The method as claimed in claim 2, wherein the second predetermined angle is in a range 0° to 45°.

6. A control method of operating a controlled bridge rectifier in a system with an input controlled bridge rectifier circuit with upper leg semiconductor switches and lower leg semiconductor switches, a DC bus capacitor, and one or more controllers, the method comprising:
    estimating a measure of even ordered harmonics present in a supply voltage;
    triggering the upper leg switches and the lower leg switches at different predetermined angles by the one or more controllers based on the estimated measure when the estimated measure is greater than a pre-set threshold voltage magnitude; and
    suppressing the effects of even order harmonics present in the supply voltage on the DC bus capacitor;
    wherein estimating the measure of even ordered harmonics present in the supply voltage (v$_{line}$) comprises calculating an asymmetry factor (AF) value of the supply voltage using $$AF = \frac{||V_{pos\_peak}| - |V_{neg\_peak}||}{V_{rms}}$$

wherein V$_{pos\_peak}$ is the positive peak voltage, V$_{neg\_peak}$ is the negative peak voltage and V$_{rms}$ is the root mean square value of the supply voltage.

7. The method as claimed in claim 6, wherein the method comprises:
    triggering the upper leg switches at the first predetermined angle and the lower leg switches at the second predetermined angle if the AF is less than the pre-set threshold magnitude and if an average value of a Zero Cross Detector (ZCD) is less than a first ZCD threshold value;
    or
    triggering the upper leg switches at the second predetermined angle and the lower leg switches at the first predetermined angle if the AF is less than the pre-set threshold magnitude and if the average value of the ZCD is more than a second ZCD threshold value.

8. The method as claimed in claim 6, wherein the method comprises:
    triggering the upper leg switches at a first predetermined angle and the lower leg switches at a second predetermined angle if the AF is more than the pre-set threshold magnitude, and a positive peak value of $v_{line}$ is more than an absolute value of a negative peak value of $v_{line}$; or triggering the upper leg switches at the second predetermined angle and the lower leg switches at the first predetermined angle if the AF is more than the pre-set threshold magnitude, and the positive peak value of $v_{line}$ is less than the absolute value of the negative peak of $v_{line}$.

9. The method as claimed in claim 8, wherein the first predetermined angle is in a range 0° to 45°.

10. The method as claimed in claim 8, wherein the second predetermined angle is in a range 0° to 45°.

11. The method as claimed in claim 8, wherein the AF threshold is below a protection threshold required to protect the DC bus capacitor.

12. The method as claimed in claim 8, wherein the first ZCD threshold is above a protection threshold required to protect the DC bus capacitor.

13. The method as claimed in claim 8, wherein the second ZCD threshold is below a protection threshold required to protect the DC bus capacitor.

14. A control method of operating a controlled bridge rectifier in a system with an input controlled bridge rectifier circuit with upper leg semiconductor switches and lower leg semiconductor switches, a DC bus capacitor, and one or more controllers, the method comprising:

estimating a measure of even ordered harmonics present in a supply voltage;

wherein estimating the measure of even ordered harmonics present in the supply voltage ($v_{line}$) comprises calculating an asymmetry factor (AF) value of the supply voltage using $$AF = \frac{||V_{pos\_peak}| - |V_{neg\_peak}||}{V_{rms}}$$

wherein $V_{pos\_peak}$ is the positive peak voltage, $V_{neg\_peak}$ is the negative peak voltage and $V_{rms}$ is the root mean square value of the supply voltage;

triggering the upper leg switches and the lower leg switches at different predetermined angles by the one or more controllers based on the estimated measure; and suppressing the effects of even order harmonics present in the supply voltage on the DC bus capacitor;

triggering the upper leg switches at a first predetermined angle and the lower leg switches at a second predetermined angle if the AF is more than a pre-set threshold magnitude, and a positive peak value of $v_{line}$ is more than an absolute value of a negative peak value of $v_{line}$; or triggering the upper leg switches at the second predetermined angle and the lower leg switches at the first predetermined angle if the AF is more than the pre-set threshold magnitude, and the positive peak value of $v_{line}$ is less than the absolute value of the negative peak of $v_{line}$.

15. The method as claimed in claim 14, wherein the method comprises:

triggering the upper leg switches at the first predetermined angle and the lower leg switches at the second predetermined angle if the AF is less than the threshold and if an average value of Zero Cross Detector (ZCD) is less than a first ZCD threshold value; or triggering the upper leg switches at the second predetermined angle and the lower leg switches at the first predetermined angle if the AF is less than the threshold and if the average value of ZCD is more than a second ZCD threshold value.

16. The method as claimed in claim 15, wherein the first predetermined angle is in a range 0° to 45°.

17. The method as claimed in claim 15, wherein the second predetermined angle is in a range 0° to 45°.

18. The method as claimed in claim 15, wherein the AF threshold is below a protection threshold required to protect the DC bus capacitor.

19. The method as claimed in claim 15, wherein the first ZCD threshold is above a protection threshold required to protect the DC bus capacitor.

20. The method as claimed in claim 15, wherein the second ZCD threshold is below a protection threshold required to protect the DC bus capacitor.

* * * * *